(12) United States Patent
Stoldt

(10) Patent No.: US 10,641,305 B2
(45) Date of Patent: May 5, 2020

(54) LINK EXTENSION CONNECTOR

(71) Applicant: FORUM US, INC., Houston, TX (US)

(72) Inventor: Frederik Stoldt, Hamburg (DE)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 15/471,150

(22) Filed: Mar. 28, 2017

(65) Prior Publication Data
US 2018/0283427 A1 Oct. 4, 2018

(51) Int. Cl.
*F16B 7/22* (2006.01)
*F16B 21/12* (2006.01)
*E21B 19/02* (2006.01)
*F16B 45/02* (2006.01)

(52) U.S. Cl.
CPC .............. *F16B 7/22* (2013.01); *E21B 19/02* (2013.01); *F16B 21/12* (2013.01); *F16B 45/02* (2013.01)

(58) Field of Classification Search
CPC ............. Y10T 24/4764; Y10T 24/4755; Y10T 24/4773; Y10T 24/318; Y10T 403/59; Y10T 403/598; F16B 7/22; F16B 21/12; F16B 45/02; E21B 19/02; E21B 19/04; E21B 19/06
USPC ........................................................ 403/321
See application file for complete search history.

(56) References Cited

U.S. PATENT DOCUMENTS

| | | | |
|---|---|---|---|
| 582,780 A | 5/1897 | Eldridge | |
| 664,814 A * | 12/1900 | Manes | A44C 5/145 24/265 H |
| 1,650,038 A | 11/1927 | Potter | |
| 1,709,235 A * | 4/1929 | Shaffer | F16B 45/02 24/375 |
| 2,074,109 A * | 3/1937 | Grau | E21B 19/06 294/90 |
| 2,354,217 A * | 7/1944 | Mullinix | E21B 19/06 294/90 |
| 2,357,478 A | 9/1944 | Koch | |
| 2,412,895 A * | 12/1946 | Lewis | A62B 35/0075 182/3 |
| 3,310,333 A | 3/1967 | Hutson | |
| 3,403,791 A * | 10/1968 | Brackin | E21B 19/06 414/22.51 |
| 3,461,666 A | 8/1969 | Burstall | |
| 3,996,737 A * | 12/1976 | Burstall | B21K 1/72 59/35.1 |

(Continued)

FOREIGN PATENT DOCUMENTS

| | | |
|---|---|---|
| DE | 3611473 A1 | 10/1987 |
| FR | 3002156 A1 | 8/2014 |
| WO | 2007/040430 A1 | 4/2007 |

OTHER PUBLICATIONS

International Search Report and Written Opinion dated Apr. 26, 2018, corresponding to Application No. PCT/US2018/017277.

(Continued)

*Primary Examiner* — Matthew R McMahon
(74) *Attorney, Agent, or Firm* — Patterson & Sheridan, L.L.P.

(57) ABSTRACT

A link extension having an integral link connector disposed at one end and an eyelet disposed at an opposite end. The link connector is configured to connect to another link. The link connector has body having an upper portion and a lower portion, and a blocking member pivotably coupled to the upper portion by a pin.

19 Claims, 5 Drawing Sheets

(56) References Cited

U.S. PATENT DOCUMENTS

| | | | | |
|---|---|---|---|---|
| 4,577,374 A * | 3/1986 | Lii | ............... | A44B 11/28 |
| | | | | 24/165 |
| 4,793,422 A * | 12/1988 | Krasnov | ............ | E21B 19/20 |
| | | | | 175/113 |
| 4,800,968 A * | 1/1989 | Shaw | ............ | E21B 19/02 |
| | | | | 166/66.5 |
| 6,336,260 B1 | 1/2002 | Mauthner | | |
| 6,378,614 B1 * | 4/2002 | Adams | ............ | E21B 19/002 |
| | | | | 166/368 |
| 6,832,658 B2 * | 12/2004 | Keast | ............ | E21B 3/02 |
| | | | | 166/77.52 |
| 6,920,926 B2 | 7/2005 | York et al. | | |
| 7,228,600 B1 * | 6/2007 | Selby | ............ | F16B 45/02 |
| | | | | 24/265 H |
| 7,303,021 B2 * | 12/2007 | Schats | ............ | E21B 19/06 |
| | | | | 166/379 |
| 7,314,090 B2 * | 1/2008 | Thomas, Jr. | ............ | E21B 3/04 |
| | | | | 166/380 |
| 7,343,647 B1 * | 3/2008 | Kinskey | ............ | A45F 5/00 |
| | | | | 16/406 |
| 7,360,603 B2 * | 4/2008 | Springett | ............ | E21B 19/06 |
| | | | | 166/380 |
| 8,888,155 B2 * | 11/2014 | Nommensen | ............ | B63B 21/54 |
| | | | | 294/82.17 |
| 8,888,398 B2 * | 11/2014 | Werth | ............ | A61M 39/1011 |
| | | | | 285/365 |
| 8,919,841 B2 * | 12/2014 | Havens | ............ | E21B 19/06 |
| | | | | 166/77.52 |
| 9,470,258 B2 | 10/2016 | Fitz-Earle et al. | | |
| 9,556,690 B1 * | 1/2017 | Marquez | ............ | E21B 19/06 |
| 9,580,978 B2 * | 2/2017 | Bisel | ............ | E21B 19/06 |
| 9,670,038 B2 * | 6/2017 | Boutwell, Jr. | ............ | B66C 19/00 |
| 9,732,567 B2 * | 8/2017 | Hayes | ............ | E21B 19/06 |
| 10,392,876 B2 * | 8/2019 | Harshbarger | ............ | E21B 19/07 |
| 10,502,249 B2 * | 12/2019 | Stoldt | ............ | F16B 45/06 |
| 2006/0162138 A1 | 7/2006 | Kimura | | |
| 2007/0056147 A1 * | 3/2007 | Tracy | ............ | F16B 45/00 |
| | | | | 24/265 H |
| 2007/0084894 A1 * | 4/2007 | Burns | ............ | B62B 5/00 |
| | | | | 224/572 |
| 2007/0261210 A1 * | 11/2007 | Chen | ............ | F16B 21/165 |
| | | | | 24/265 H |
| 2008/0174130 A1 * | 7/2008 | Lin | ............ | F16B 45/02 |
| | | | | 294/82.2 |
| 2010/0162531 A1 * | 7/2010 | Hong | ............ | F16B 45/02 |
| | | | | 24/265 H |
| 2010/0306974 A1 * | 12/2010 | Munoz | ............ | F16B 45/02 |
| | | | | 24/598.8 |
| 2011/0283486 A1 * | 11/2011 | Boonstra | ............ | F16G 11/06 |
| | | | | 24/265 H |
| 2015/0069775 A1 * | 3/2015 | Knox | ............ | F16B 45/00 |
| | | | | 294/82.15 |

OTHER PUBLICATIONS

"Center of Gravity—CG." Glenn Research Center; Edited by Nancy Hall, NASA, May 5, 2015, www.grc.nasa.gov/www/k-12/airplane/cg.html. Accessed: Mar. 20, 2019. (3 pages).

International Search Report and Written Opinion issued in International Patent Application No. PCT/US2017/016808, dated Jun. 9, 2017 (13 pages).

Gulf Cooperation Council Office Action dated Dec. 25, 2019 for Application No. 2018-35020.

* cited by examiner

LINK EXTENSION CONNECTOR

BACKGROUND

Field

Embodiments of this disclosure relate to a link extension having a connector for connecting an elevator to an upper link.

Description of the Related Art

Links are used to connect a variety of rig equipment together. For example, links are used to connect a top drive/traveling block with an elevator. The links are used in a set of two coupled between the top drive/traveling block and the elevator. If the links are not long enough, a set of link extensions are connected to the links by a separate connector to form a "link chain" to provide the additional length. However, these link chains have multiple degrees of freedom to move, which can lead to undesired swaying and/or uncontrolled movement when the top drive/traveling block moves the elevator. Such swaying and movement may cause damage to surrounding equipment and endanger rig personnel.

Therefore, there is a need for providing link extensions that reduce undesired swaying and/or uncontrolled movement when in use.

SUMMARY

A link extension having an integral connector for connecting or adapting links together.

In one embodiment, a link extension comprises an elongated support member having a first end and an opposite second end; a link connector disposed at the first end, wherein the link connector includes: a body having an upper portion and a lower portion; and a blocking member pivotably coupled to the upper portion by a pin; and an eyelet disposed at the second end.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be advantageously adapted for utilization in other embodiments described herein.

DETAILED DESCRIPTION

Figure 1:
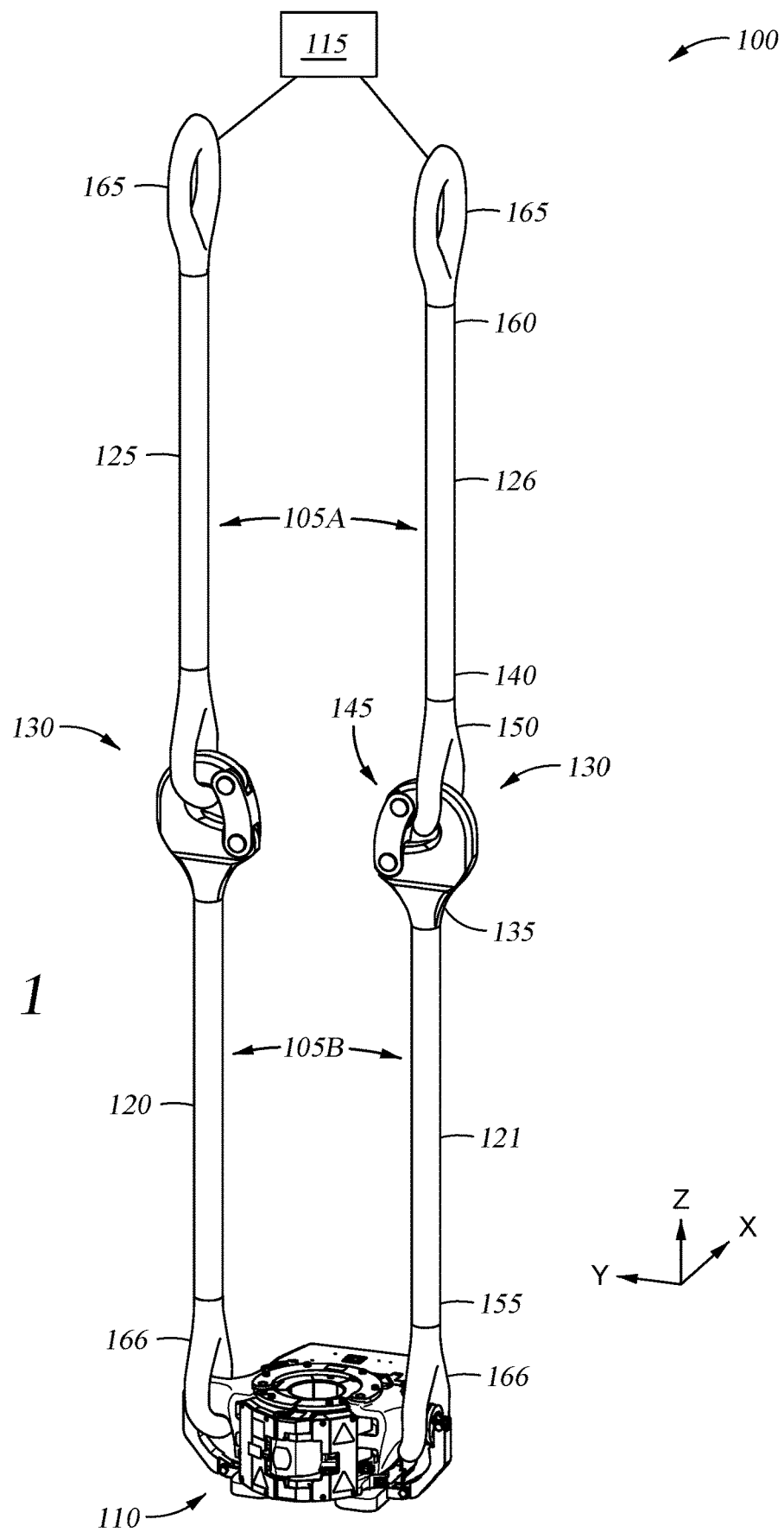
FIG. 1 is a perspective view illustrating a link assembly connecting an elevator to a top drive/traveling block.

FIG. 1 is a perspective view illustrating a link assembly 100 having a first set of links 105A coupled to a second set of links 105b by link connectors 130. The link assembly 100 connects an elevator 110 to a top drive/traveling block 115. Although illustrated as supporting an elevator 110, the first set of links 105A and the second set of links 105B of the link assembly 100 can be used to support any type of tubular handling device or rig equipment.

The first set of links 105A include a first upper link 125 and a second upper link 126. The upper links 125, 126 are in the form of an elongated support member having an eyelet 165 disposed at a first end 160 and another eyelet 150 disposed at an opposite, second end 140. The eyelets 165 disposed on the first end 160 connect to the top drive/traveling block 115.

The second set of links 105B include a first link extension 120 and a second link extension 121. The link extensions 120, 121 are in the form of an elongated support member having an integral link connector 130 disposed at a first end 135 and an eyelet 166 disposed at an opposite, second end 155. The eyelets 166 disposed on the second end 155 connect to the elevator 110.

The link connectors 130 are releasably coupled to the second end 140 of the upper links 125, 126 by a latch mechanism 145. The latch mechanism 145 can be opened and closed to insert and remove the eyelets 150 of the upper links 125, 126 to and from the link connectors 130 of the link extensions 120, 121. The latch mechanism 145 can be locked in a closed position to prevent the eyelets 150 from falling out of the link connectors 130 during use.

Conventional link extensions are coupled to other links by a separate link connector that would be used to connect the second ends 140 of the upper links 125, 126 to the first ends 135 of the link extensions 120, 121. However, a separate link connector would provide the upper links 125, 126 and the link extensions 120, 121 with several degrees of freedom of movement that can lead to undesired swaying and/or uncontrolled movement of the elevator 110 when moved by the top drive/traveling block 115. Additionally, a separate link connector can cause the upper links 125, 126 and the link extensions 120, 121 to buckle if moved in the wrong direction.

The link extensions 120, 121 as disclosed herein eliminate the need for a separate link connector by integrally forming the link connectors 130 as part of the link extensions 120, 121. The link connectors 130 of the link extensions 120, 121 directly connect to the upper links 125, 126, which reduces the amount of degrees of freedom of movement that can occur during use compared to using a separate link connector. The advantage is an increase in safety for rig personnel as well as a decrease in risk of damage to surrounding equipment. Additionally, the link connectors 130, being integral with the link extensions 120, 121 reduces the number of parts as compared to using a separate link connector.

Figure 2:
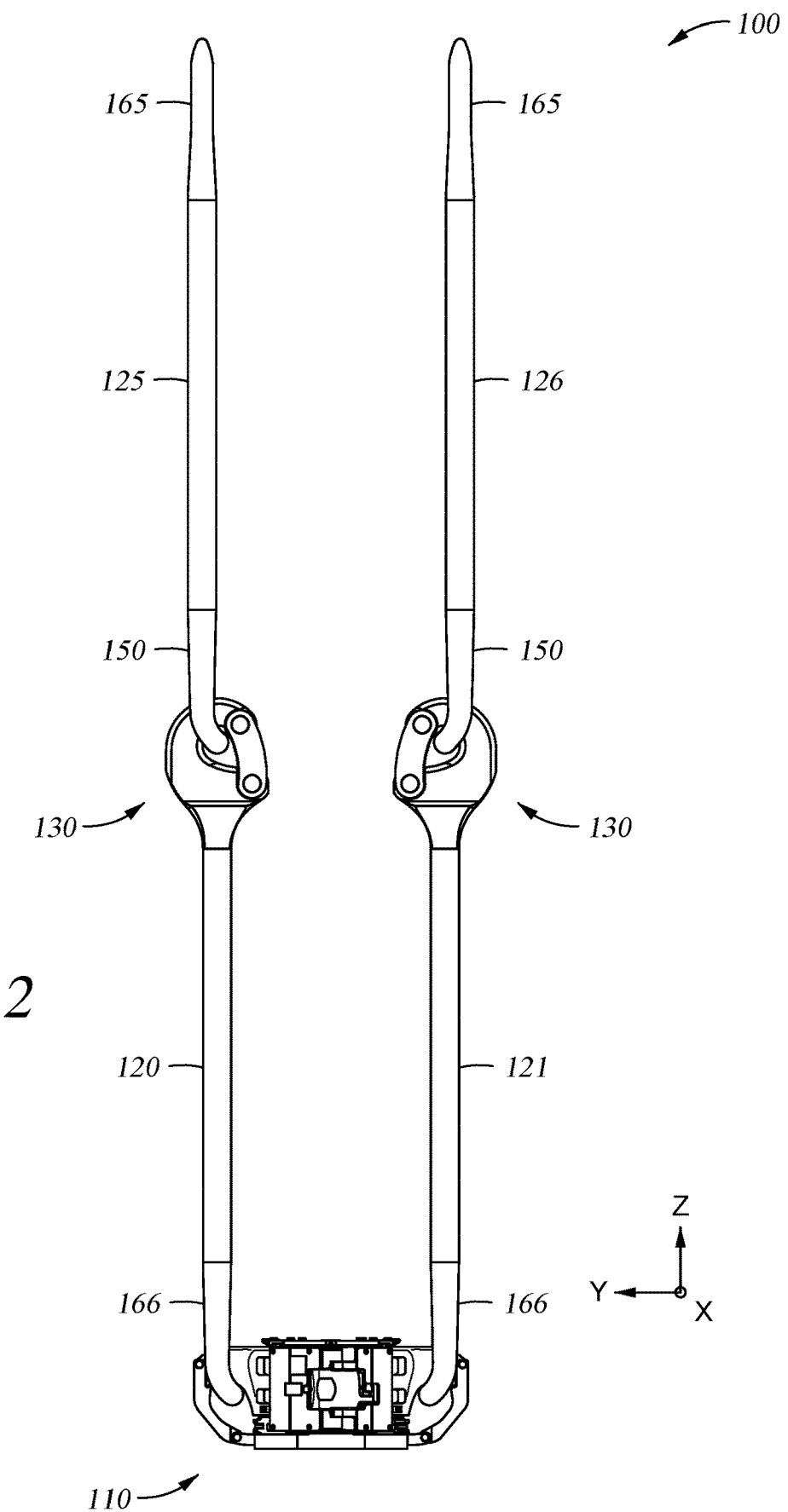
FIG. 2 is a side view of the link assembly of FIG. 1.

FIG. 2 is a side view of the link assembly 100 of FIG. 1. The eyelets 165, 150 of the upper links 125, 126 are substantially aligned with a first plane (the X-Z plane as shown) while the link connectors 130 of the link extensions 120, 121 are substantially aligned with a second plane (the Y-Z plane as shown) that is orthogonal to the first plane (the X-Z plane). Similarly, the eyelets 166 of the link extensions 120, 121 are substantially aligned with the first plane (the X-Z plane as shown) while the link connectors 130 are substantially aligned with the second plane (the Y-Z plane as shown) that is orthogonal to the first plane (the X-Z plane).

Figure 3A:
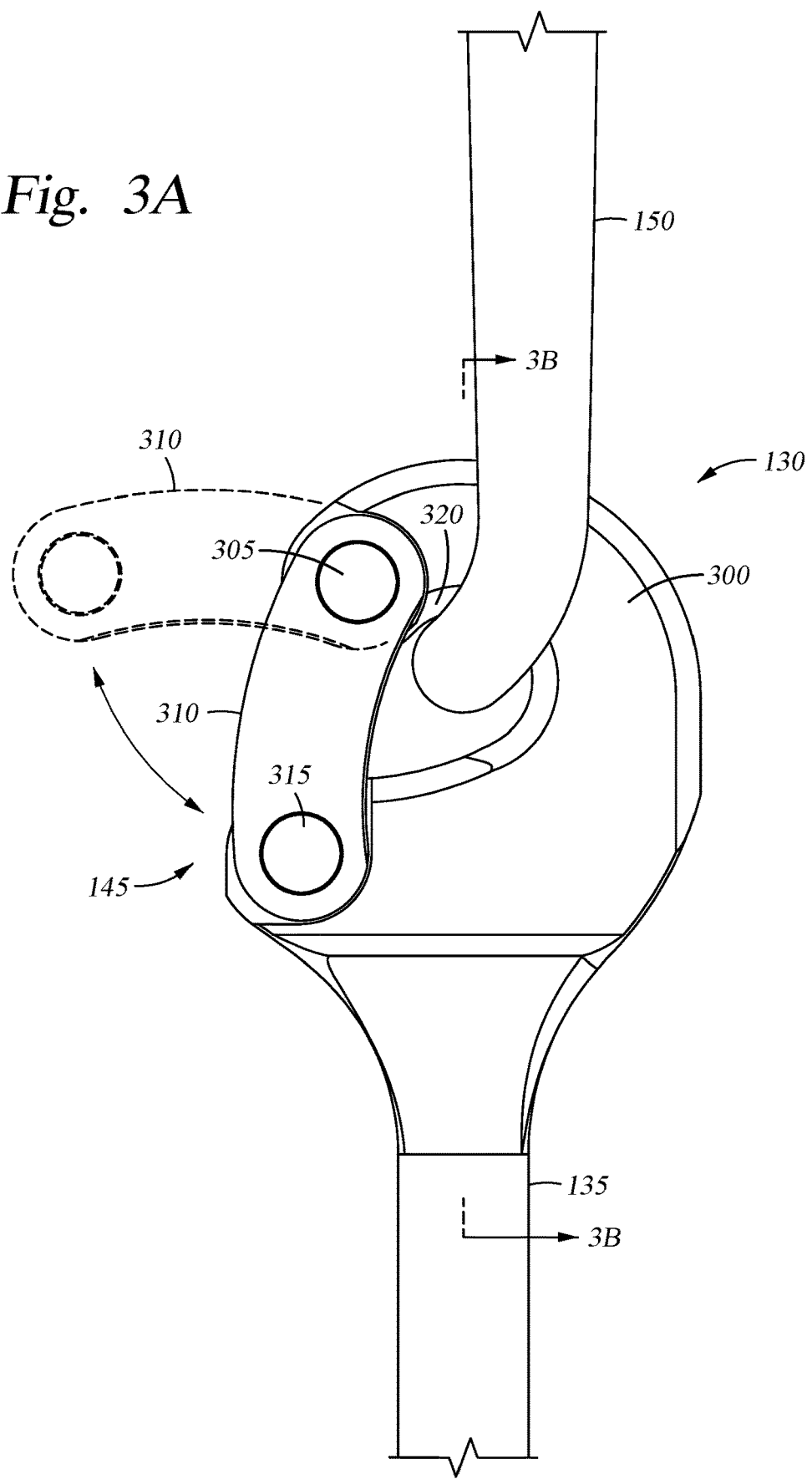
FIG. 3A is an enlarged side view of a link extension connector of FIG. 1.
Figure 3B:
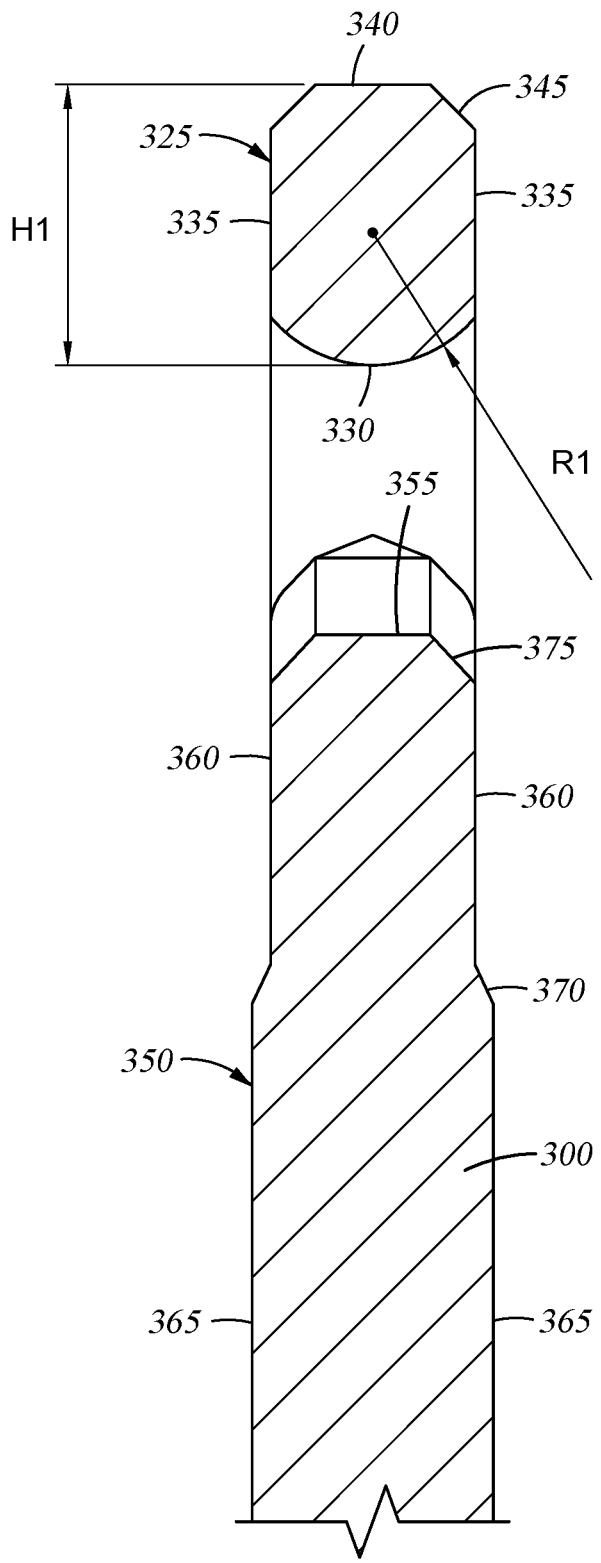
FIG. 3B is a sectional view of the link extension connector along lines 3B-3B of FIG. 3A.

FIG. 3A is an enlarged side view of one of the link connectors 130, and FIG. 3B is a sectional view along lines 3B-3B of FIG. 3A. The link connector 130 includes a body 300 to which the latch mechanism 145 is pivotably coupled. A first pin 305 provides a hinged connection between the body 300 and a blocking member 310. A second pin 315 may be removed by rig personnel so that the blocking member 310 can be moved from a closed position to an open position (shown in phantom) so that the eyelet 150 can be inserted within or removed from a hook portion 320 of the body 300.

The profile of a cross section of an upper portion 325 of the body 300 has a lower surface 330 with a radius R1 configured to support a desired size (or load rating) of an upper link, such as a 500 ton upper link, and a height H1 configured to support a larger or smaller size (or load rating) of an upper link. In one embodiment, the upper portion 325 of the body 300 is configured to support an upper link with an eyelet size that is different than (e.g. larger or smaller than) an eyelet size of the link extensions 120, 121. For example, the eyelet 150 of the upper link 125 is a different size than the eyelet 166 of link extension 120. In one embodiment, the upper portion 325 of the body 300 is configured to support an upper link with a load rating that is different than (e.g. larger or smaller than) a load rating of the link extensions 120, 121. For example, the upper link 125 has a load rating that is larger or smaller than a load rating of the link extension 120.

The lower surface 330 contacts the eyelet 150. The lower surface 330 transitions to substantially parallel sidewalls 335 that intersect with a top surface 340. The top surface 340 may be in a plane that is substantially normal to a plane of the sidewalls 335. A bevel 345 may be formed between the sidewalls 335 and the top surface 340.

The profile of a cross section of a lower portion 350 of the body 300 includes a top surface 355 that transitions to a first section of substantially parallel sidewalls 360 and a second section of substantially parallel sidewalls 365. The top surface 355 may be parallel to the top surface 340. A bevel 375 may be formed between the top surface 355 and the sidewalls 360. The cross section of the sidewalls 360 of the first section may include a thickness that is different than (e.g. less than) a thickness of the cross section of the sidewalls 365 of the second section. A shoulder 370 may be formed between the first section of sidewalls 360 and the second section of sidewalls 365.

A height of the cross section of the upper portion 325 of the body 300 is different than a height of the cross section of the lower portion 350 of the body 300. As illustrated, the height of the cross section of the upper portion 325 of the body 300 is less than the height of the cross section of the lower portion 350 of the body 300.

Figure 4:
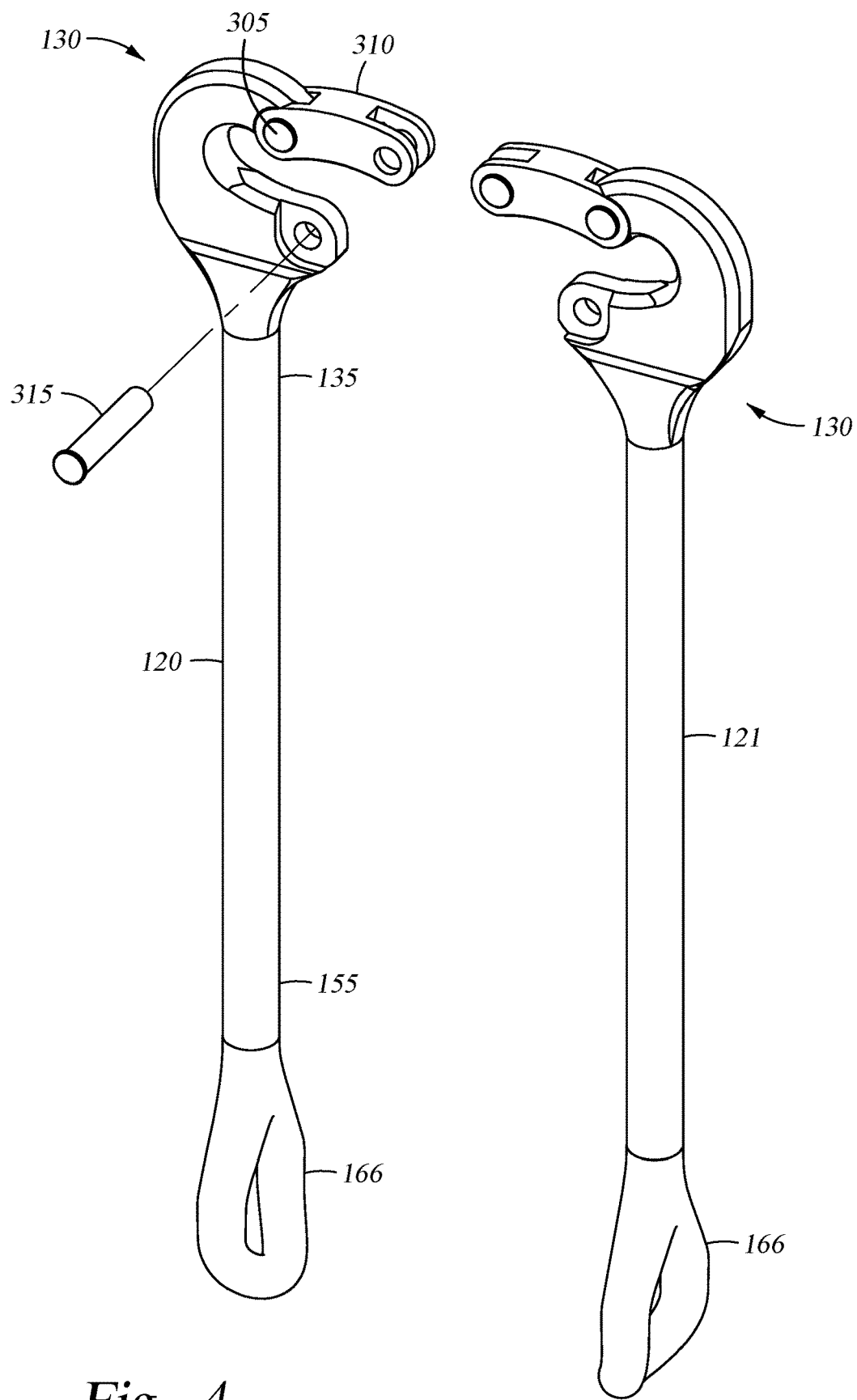
FIG. 4 is a perspective view of the link extension connectors in an open position.

FIG. 4 is a perspective view of the link extensions 120, 121 with the link connectors 130 in an open position. The first pin 305 acts as a hinge pin about which the blocking member 310 can pivot when the second pin 315 is removed to open and close the latch mechanism 145 of the link connectors 130. The center of gravity of the link connectors 130 may be in the middle of the body 300 to enable a balanced and vertical hanging of link extensions 120, 121 from the upper links 125, 126.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A link extension assembly, comprising:
   a first link comprising an elongated support member having an eyelet disposed at a first end and another eyelet disposed at an opposite second end; and
   a second link comprising:
      an elongated support member having a first end and an opposite second end;
      a link connector integrally formed with the first end of the elongated support member, wherein the link connector includes:
         a body having an upper portion and a lower portion; and
         a blocking member pivotably coupled to the upper portion by a pin; and
      an eyelet disposed at the second end of the second link, wherein the eyelet disposed at the second end of the second link is substantially aligned with a first plane, wherein the link connector is substantially aligned with a second plane, wherein the first plane is orthogonal to the second plane such that the eyelet disposed at the second end of the second link and the link connector are oriented 90 degrees relative to each other; and
   wherein the eyelets of the first link are substantially aligned with the first plane, and wherein one of the eyelets of the first link is coupled to the link connector such that the second link is suspended from the first link, and the upper portion of the body of the link connector has a rounded surface that defines a radius in a cross section of the upper portion extending along the first plane.

2. The link extension assembly of claim 1, wherein another pin is disposed through the body and the blocking member to secure the link connector in a closed position.

3. The link extension assembly of claim 1, wherein a center of gravity of the link connector is located in a middle of the body.

4. The link extension assembly of claim 1, wherein one of the eyelets of the first link is secured to the upper portion of the body by the blocking member.

5. The link extension assembly of claim 4, wherein one of the eyelets of the first link contacts the rounded surface of the upper portion of the body.

6. The link extension assembly of claim 5, wherein the rounded surface transitions into a pair of substantially parallel sidewalls, the rounded surface extending between the pair of substantially parallel sidewalls to define the radius.

7. The link extension assembly of claim 1, wherein the cross section of the upper portion of the body has a height that is different than a height of a cross section of the lower portion of the body.

8. The link extension assembly of claim 7, wherein the cross section of the lower portion of the body has a first section of substantially parallel sidewalls and a second section of substantially parallel sidewalls, wherein the first section has a thickness less than a thickness of the second section, and the first section is disposed between the second section and the upper portion of the body.

9. The link extension assembly of claim 1, wherein at least one of the eyelets of the first link has a size that is different than the eyelet of the second link.

10. The link extension assembly of claim 1, wherein a load rating of the first link is different than a load rating of the second link.

11. The link extension assembly of claim 1, wherein the eyelet of the second link is integrally formed with the second end of the elongated support member of the second link to form a single unitary body.

12. A link extension assembly, comprising:
a first link comprising an elongated support member having an eyelet disposed at a first end and another eyelet disposed at an opposite second end; and
a second link comprising:
an elongated support member having a first end and an opposite second end;
a link connector disposed at the first end of the second link, wherein the link connector includes:
a body having an upper portion and a lower portion; and
a blocking member pivotably coupled to the upper portion by a pin; and
an eyelet disposed at the second end of the second link, wherein the eyelet disposed at the second end of the second link is pivotable about a Y-axis and is substantially aligned with a first plane defined by an X-axis and a Z-axis, the first plane extending along a central opening of the eyelet disposed at the second end of the second link, wherein the link connector is pivotable about the X-axis and is substantially aligned with a second plane defined by the Y-axis and the Z-axis, the second plane extending through the body and the blocking member and extending orthogonally to a longitudinal axis of the pin, wherein the first plane is orthogonal to the second plane such that the eyelet disposed at the second end of the second link and the link connector are oriented 90 degrees relative to each other; and
wherein the eyelets of the first link are substantially aligned with the first plane, and wherein one of the eyelets of the first link is coupled to the link connector such that the second link is suspended from the first link.

13. The link extension assembly of claim 12, wherein another pin is disposed through the body and the blocking member to secure the link connector in a closed position.

14. The link extension assembly of claim 12, wherein a center of gravity of the link connector is located in a middle of the body.

15. The link extension assembly of claim 12, wherein one of the eyelets of the first link is secured to the upper portion of the body by the blocking member.

16. The link extension assembly of claim 15, wherein one of the eyelets of the first link contacts a rounded surface of the upper portion of the body, the rounded surface defining a radius in a cross section of the upper portion extending along the first plane.

17. The link extension assembly of claim 16, wherein the rounded surface transitions into a pair of substantially parallel sidewalls, the rounded surface extending between the pair of substantially parallel sidewalls to define the radius.

18. The link extension assembly of claim 12, wherein a cross section of the upper portion of the body has a height that is different than a height of a cross section of the lower portion of the body.

19. The link extension assembly of claim 18, wherein the cross section of the lower portion of the body has a first section of substantially parallel sidewalls and a second section of substantially parallel sidewalls, wherein the first section has a thickness less than a thickness of the second section, and the first section is disposed between the second section and the upper portion of the body.

* * * * *